United States Patent [19]
Dufour

[11] Patent Number: 5,317,917
[45] Date of Patent: Jun. 7, 1994

[54] RESONANT PRESSURE TRANSDUCER

[75] Inventor: Michel Dufour, Grenoble, France

[73] Assignee: Commissariat a l'Energie Atomique, Paris, France

[21] Appl. No.: 855,312

[22] Filed: Mar. 23, 1992

[30] Foreign Application Priority Data

Mar. 27, 1991 [FR] France .............................. 91 03708

[51] Int. Cl.$^5$ .......................... G01L 7/08; G01L 11/00
[52] U.S. Cl. ........................................ 73/702; 73/717; 73/723; 73/862.41
[58] Field of Search .............. 73/702, 862.41, 862.637, 73/862.639, 862.636, 717, 723; 310/324, 338, 370

[56] References Cited

U.S. PATENT DOCUMENTS

| | | | |
|---|---|---|---|
| 4,382,385 | 5/1983 | Paros | 73/702 |
| 4,406,966 | 9/1983 | Paros | 73/702 |
| 4,476,725 | 10/1984 | Chorel et al. | 73/704 |

FOREIGN PATENT DOCUMENTS 2215053 9/1989 United Kingdom .......... G01L 1/10

Primary Examiner—Donald O. Woodiel
Attorney, Agent, or Firm—Hayes, Soloway, Hennessey, Grossman & Hage

[57] ABSTRACT

A resonant pressure transducer, having a deformable diaphragm or membrane exposed to an ambient environment wherein a pressure force to be measured exists, is provided. A transducer according to the present invention comprises a converter for transmitting the pressure force experienced by the diaphragm to a resonator vibrated by an exciter whose resonant frequency is a function of the intensity of the ambient pressure force to be determined. The converter and resonator are mounted in a rigid frame. The converter has flexible bending means able to absorb the bending moments resulting from the deformation of the diaphragm, so as to transmit to the resonator a tension or a compression force free from bending moments that generate stresses at the entrance of the resonator.

4 Claims, 2 Drawing Sheets

RESONANT PRESSURE TRANSDUCER

BACKGROUND OF THE INVENTION

1. Field of the Invention

The present invention relates to a resonant pressure transducer and in particular a small transducer of this type (e.g. with a side length of a few millimeters) produced by microelectronics technology, particularly micromachining.

2. Description of The Related Art

Resonant pressure transducers are known and first of all a basic description will be given of the physical operating principle. Such sensors generally comprise a flexible, deformable diaphragm or membrane exposed to the ambient conditions, where the pressure to be measured prevails and which transmits, by means of a converter system, the force which it supports or withstands as a result of said pressure to a resonator system, which is vibrated by an exciter and whose resonator frequency is permanently measured. As this resonant frequency is a function of the force transmitted to the resonator system, it is clear that by measuring the said frequency, an analog magnitude representative of the pressure to be measured is obtained.

The systems used for exciting the resonator and for measuring the resonant frequency belong to numerous known types and involve known physical principles. Reference can e.g. be made to the use of elastoresistive gauges inserted in a WHEATSTONE bridge and fixed to the surface of the vibrating body constituting the resonator, the use of piezoelectric materials such as zinc oxide ZnO, the use of electrostatic forces between two coatings of a capacitor, whereof one is etched on the resonator or is constituted by the resonator, etc.

With reference to the attached FIG. 1, a description will be given of a pressure transducer with conversion by oscillating crystal in accordance with the prior art. FIG. 1 shows in a box or case 2 in which there is a vacuum, a system comprising a bellows or linked by an opening 6 in the wall of the case 2 with the atmosphere, whose pressure is to be measured. This bellows 4 which expands lengthwise to a varying extent as a function of said pressure firstly acts on a converter 8, which is a lever-shaped member articulated about a pivot 10. The end 12 of said converter 10 transmits the mechanical action undergone by the bellows 4 to an oscillator crystal 14, whose resonant frequency is measured. The resonant frequency is an analog value of the pressure which it is wished to measured.

However, such prior art devices suffer from a number of specific defects, both from a technical standpoint and from an economic standpoint. Details will now be given of these. With regards to the manufacturing costs of the apparatus, these are relatively high because mass production is difficult and instead such apparatuses are individually manufactured.

Moreover, the presently envisaged manufacturing processes do not make it possible to reduce the size of the transducers below a certain level (approximately 1 or more cm in exemplified manner), whereas increasingly frequent applications require small transducers, whereof the three dimensions are e.g. a few millimeters.

Moreover, the materials used for constructing such transducers are based on various technologies, whereas microelectronics is a "monolithic" art.

Finally, with regards to their technical performance characteristics, the known resonant pressure transducers, generally only accept frequency swings of 5 to 10% with respect to the resonant frequency of the resonator, which can e.g. be between 95 and 105 kHz. This feature, which is linked with the breaking stresses of the resonator, significantly limits the range of measurements possible using these transducers.

SUMMARY OF THE INVENTION

The present invention specifically relates to a resonant pressure transducer, which solves in simple manner the deficiencies of the prior art of the type described hereinbefore, whilst making it possible to mass produce the transducers in miniaturized form.

This resonant pressure transducer has a deformable diaphragm or membrane, exposed to ambient conditions where the pressure to be measured prevails, a converter able to transmit the force supported in this way by the diaphragm to a resonator vibrated by an exciter and whose resonant frequency, which is measured, is a function of the intensity of said force, i.e. the pressure to be determined, and is characterized in that the assembly formed by the converter and the resonator is mounted in a rigid frame, the converter having flexible, bending means able to absorb the bending moments resulting from the deformation of the diaphragm, so as to transmit to the resonator a tension or a compression free from bending, which generates stresses located at the entrance of the resonator.

The pressure transducer according to the invention makes it possible to reduce to a minimum, or even completely eliminate the appearance at the entrance of the resonator of operation-prejudicial or dangerous, localized stresses and which develop in the prior art transducers, because no special means are provided in the converter to prevent the formation thereof. Thus, the system of forces applied by the diaphragm is transmitted by the converter system to the resonator is not a system of pure forces and has torques resulting from the direction change of the force applied to the diaphragm during its transmission by the converter.

According to an important feature of the present invention, the pressure transducer is characterized in that the converter—resonator assembly is installed in a rectangular rigid frame having along its longitudinal axis a pivot mounted so as to rotate about two hinges connecting it to the side walls of the frame and whereof the general direction is perpendicular to the longitudinal axis of the frame, a shoulder connected to the frame walls by means of two or more fins in the form of strips, whose plane is substantially perpendicular to the plane of the frame, a flexible, bending beam connecting the shoulder and the pivot and a beam serving as a resonator, connecting the side of the shoulder opposite to the flexible, bending beam to one of the sides of the rigid frame perpendicular to the longitudinal axis of the frame and in that the rigid frame is mounted in the median plane of a parallelepipedic box or case, whereof at least one of its faces parallel to the plane of the frame is constituted by a diaphragm deformable under the action of the pressure to which it is exposed, the deformations of said diaphragm being transmitted to the pivot by a stud integral with the diaphragm and mechanically interconnecting the diaphragm and the pivot.

As a result of the components of the converter and the resonator held by the rigid frame and the fact that the reciprocal dimensions and distribution of the different parts forming it are calculated by the computer with a view to the sought objective, when correctly optimized, said structure ensures that only pure compressions or tensions are transmitted to the entrance of the beam forming the resonator, whilst excluding any bending moment.

Thus, by eliminating resonator destruction risks, this makes it possible to use a much higher resonant frequency range, whose variations are approximately 100% around the centre resonant frequency. Such an apparatus can e.g. operate perfectly with resonant frequencies between 50 and 150 kHz, which e.g. gives a transducer performance range between 0 and 50 or 0 and 1 bar with an accuracy of $10^{-4}$.

The resonant pressure transducer according to the invention has additional advantages to those defined herein-before when miniaturized and produced by using microelectronics or micromachining procedures.

Thus, in this case, all the parts from which it is made are produced, for the case on the one hand and for the frame on the other, in a one-piece silicon or quartz substrate, which gives them a crystalline structure guaranteeing the ultimate strength value of the material in operation, contrary to what happens in the case of macroscopic productions in which the production process can deteriorate the constituent materials which, intrinsically or by the juxtapositioning of mechanical qualities, cannot be as good as those of monocrystalline silicon or quartz. Independently of the miniaturization, which increases the scope of possible uses for the transducer, the use of quartz for producing the apparatus e.g. allows an easy excitation—detection of the resonator with the aid of a piezoelectric detector, as well as the construction of electrical output ducts which necessarily connect the resonator to the exterior by ionic implantation of titanium in the quartz. If the apparatus and therefore the resonator are made from silicon, the excitation and detection can be brought about with the aid of a simple p-n junction etched in the silicon and the associated electrostatic connection.

With regards to the operation of the shoulder-resonator-fin assembly, it is pointed out that the stiffness along the axis of the resonator of said assembly is imposed by the resonator, whereas the shoulder-fin assembly is alone responsible for compensating a residual bending moment at the entrance of the resonator. This is the reason for the shape of the ribs or fins joining the shoulder to the rigid frame, which are e.g. constituted by vertical strips perpendicular to the plane of the rigid frame and preventing any rotation of the shoulder according to an axis perpendicular to the longitudinal axis of the frame.

According to the invention, in order to produce a resonant pressure transducer of the aforementioned type with the aid of microelectronics and micromachining processes, the following procedure is adopted. The case having the diaphragm and the rigid frame are produced separately from the same material chosen from among quartz and silicon using a one-piece substrate of the material, which is etched to the desired shape with the aid of known micromachining processes. The parts produced separately in this way are then assembled to form a complete transducer.

The invention will be better understood from the following description relative to FIGS. 2 to 6 of a non-limitative embodiment of the resonant pressure transducer according to the invention. The following description relates to a mini-transducer with dimensions of a few millimetres and produced by micromachining. This embodiment merely illustrates one of the many interesting applications of the invention. Transducers with larger dimensions and not produced by micromachining also fall within the scope of the invention.

DETAILED DESCRIPTION OF PREFERRED EMBODIMENTS

Figure 1:
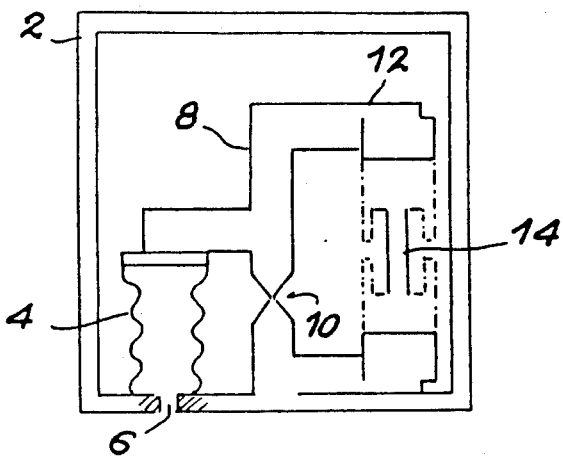
FIG. 1, which has been discussed previously, illustrates a pressure transducer made according to the prior art.
Figure 2:
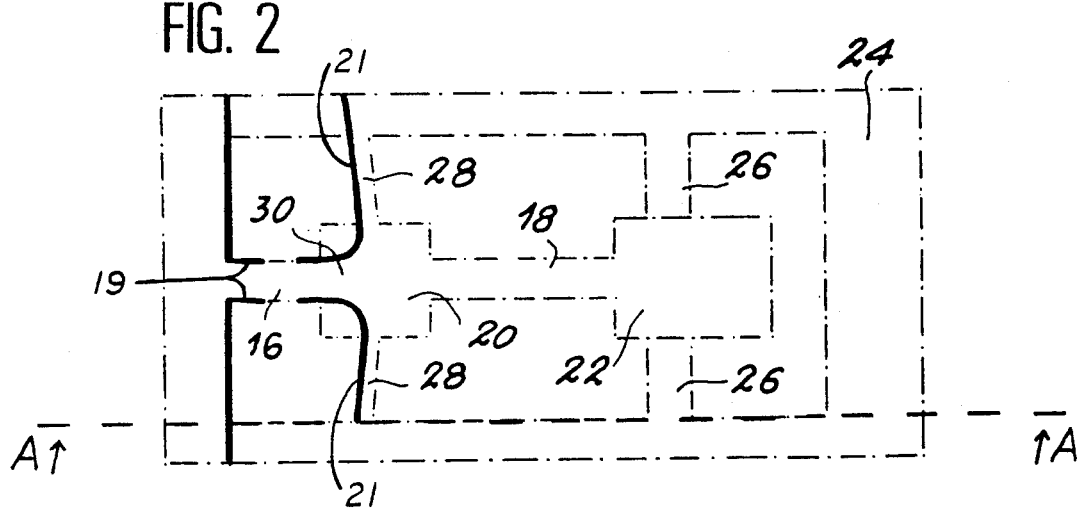
FIG. 2 is a plan view of the rigid frame having the pivot, the bending beam, the shoulder and the resonator.

FIG. 2 shows the essential part of the resonant transducer according to the invention comprising the resonator 16, the bending beam 18, the shoulder 20 and the pivot 22 located within the rigid frame 24. The assembly has a side length of a few millimeters and is obtained by etching a quartz or silicon substrate. According to the invention the pivot 22 is connected to the rigid frame 24 by hinges 26 and the shoulder 20 is connected to said same frame 24 by a system of ribs or fins 28 (two in the embodiment shown), which are constituted by thin strips perpendicular to the plane of FIG. 2. The flexible, bending beam 18 directly connects the pivot 22 to the shoulder 20. In other constructions, the connection between the shoulder 20 and the frame 24 can be by a system of beams producing the same effect of compensating a residual bending moment at the entrance of the resonator.

Figure 3:
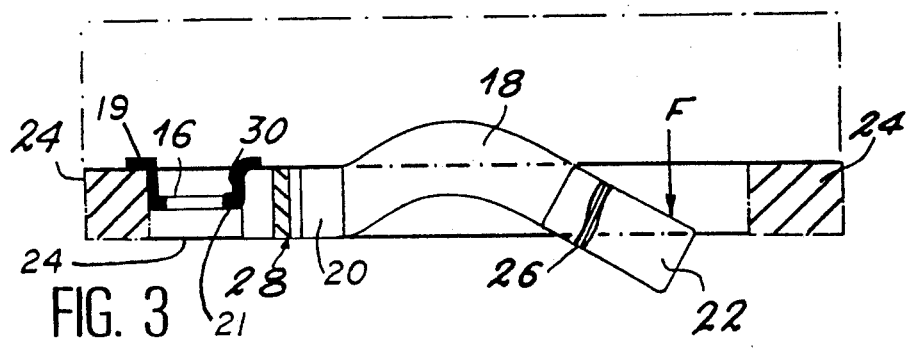
FIG. 3 is a sectional view along A—A of FIG. 2.

On referring now to the sectional view of FIG. 3. it is possible to see the aforementioned elements carrying the same reference numerals. The end of the pivot 22 is the application point of the pressure indicated by the arrow F and it is this pressure which deforms the bending beam 18 which, as can be seen in FIG. 3, is given a dome-shaped profile. The shoulder 20 is designed so as to permit, in conjunction with the system of fins 28, the compensation of any residual bending which could still exist at the resonator entrance 30.

According to the invention, the assembly of the pivot 22 of the bending beam 18 and the shoulder 20 transmits the force or stress F to the converter system (22, 18, 20), whilst absorbing the bending moments, so as to only transmit to the resonator 16 constituted by a planar beam, a simple compressive or tensile stress. In the embodiment of FIGS. 2 and 3, the bending beam 18 is a single beam, whose profile is optimized by the computer as a function of the aforementioned requirements. The resonator 16 is also a single beam, but in certain cases could cover the structure with a "tuning fork" having several branches. It is clear that the resonant frequency used for measuring the pressure can be any random one of the vibrating modes of said resonator 16, although all are not equally well suited to the solution of the sought problem. In the same way, the vibration plane of the resonator is not imposed by the principle and is instead imposed more by technological considerations. It could e.g. be perpendicular to the plane of the substrate in which it is machined or parallel to said plane, as is e.g. the case with a resonator produced using quartz technology.

The resonator 16 is excited by producing a small mechanical excitation on its surface with the aid of known means 19. If this excitation comprises a component (in the sense of Fourier analysis), whose frequency coincides with the resonant frequency, even if this component is very weak it is generally sufficient to start a high amplitude vibration. The resonant frequency can e.g. be detected with the aid of a deformation detection device. In certain cases, the resonance has repercussions on the exciting device and can be detected and measured by the latter.

When the rigid frame 24 is made from silicon, it is appropriate to use an electrostatic excitation with e.g. a capacitor produced on the surface of the resonator 16 forming one electrode and a second electrode surmounting a silicon nitride ($Si_3N_4$) dielectric zone. The detection can then simply take place with the aid of a WHEATSTONE bridge formed from piezoresistive gauges. In the particular case where the rigid frame 24 is made from quartz, it is of interest to use the piezoelectric property of this material, which then makes it possible to merge the excitation function and the detection function, because a simple variation in the capacitance supplying the electrical excitation indicates that the system is operating at resonance.

The function of the converter system 18, 20, 22 is to concentrate the bending stresses in the intermediate parts (pivot 22 and bending beam 18), so as to exclusively exert a clear tensile or compressive stress on the shoulder 20. Therefore the latter must exert a sufficiently high restoring torque in order to compensate, at the junction point, the torque due to the bending beam 18. However, it must oppose a tension or compression along the major axis of the resonator 16 by the minimum possible natural resistance. Thus, the tensile or compressive static stress applied to the shoulder-resonator assembly is integrally transmitted to the resonator. This latter operating feature of the transducer is in part brought about by the system of fins 28, which authorizes a longitudinal displacement of the shoulder 20, whilst at the same time considerably reducing any attempt at rotating the latter.

In summarizing, the converter system 30 is designed so that the total moment of the stresses, calculated at the engagement point 30 of the resonator in the shoulder, is zero without the resulting stress directed along the axis of the resonator 16 being zero.

Figure 4:
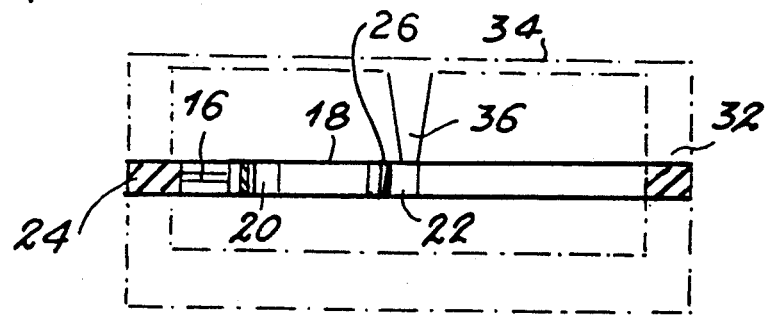
FIG. 4 is a section-elevation of a complete transducer with its case and its converter.

On referring to FIG. 4, it is possible to see the converter system 18, 20, 22, the resonator 16, installed together in a parallelepipedic case 32, whose upper surface is made thinner in order to form the flexible diaphragm 34 exposed to the pressure to be measured. Like the converter 18, 20, 22 and the resonator 16, the case 32 and the diaphragm 34 are obtained by etching a substrate in the same material. FIG. 4 shows the stud 36 fixed to the flexible diaphragm 34 and the converter pivot 22.

Figure 5:
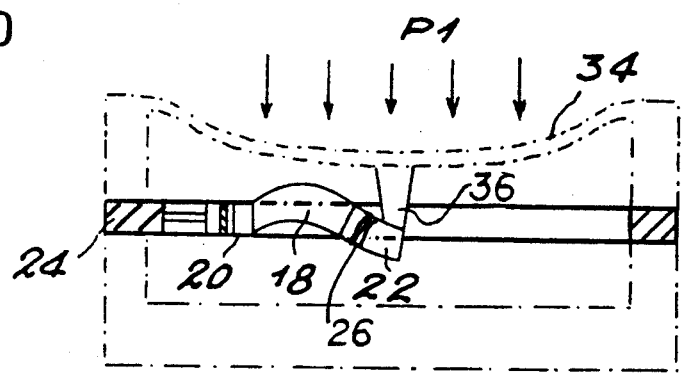
FIG. 5 shows the deformation of the transducer of FIG. 4 under the effect of a pressure P1 applied to the upper diaphragm.

FIG. 5 shows the deformation of the structure of FIG. 4 under the effect of a pressure P1 applied to the upper part of the diaphragm 34. It can be seen that under the effect of the stress exerted by the stud 36 on the pivot 26, the converter 18, 20, 22 is deformed so as to adopt a dome-shaped profile identical to that shown in FIG. 3.

Figure 6:
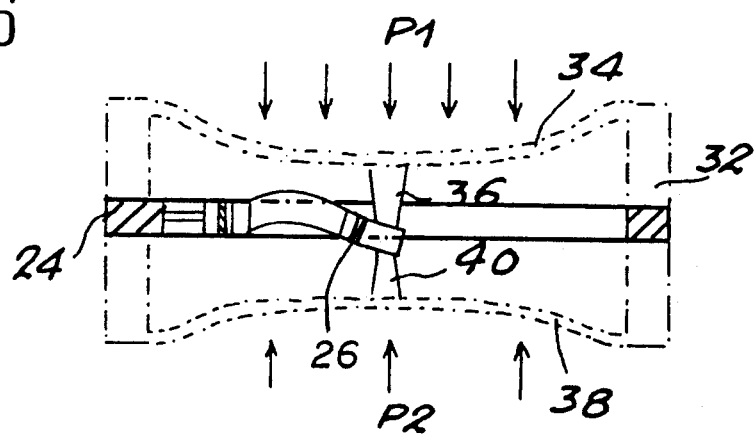
FIG. 6 shows a variant of the transducer of FIGS. 4 and 5, in which the upper and lower, opposite faces of the transducer are constituted by diaphragms respectively exposed on the one hand to the pressure P1 and on the other to the pressure P2.

In the case of FIG. 6, the resonant transducer is of the differential type, i.e. the two upper and lower faces of the case 32 are formed from a flexible diaphragm, respectively 34 and 38 and all the deformations of the diaphragms 34, 38 under the influence of the pressures P1 and P2 applied from the outside transmitting a resultant deformation to the converter system by the studs 36 and 40.

In the embodiment described, the flexible diaphragms 34, 38 have a surface area of a few square millimeters and a thickness of a few or a few dozen micrometers. If it is necessary to modify the rigidity of the diaphragms, it is possible to adapt their shape as a consequence thereof. In particular, one or more local thickness variations can make it possible to obtain diaphragms which, whilst maintaining a relatively high average thickness, still have a very limited rigidity.

In most constructions of the transducer according to the invention, the interior of the case 32 is designed in a tight manner and placed under vacuum, which considerably facilitates the vibration of the resonator.

Obviously, mechanical connections 19, 21 between the interior and exterior of the case 32 must be provided in order to carry the electric power for exciting 19 the resonator 16 and for measuring 21 on the return path, its vibrating frequency. These means are not shown in the drawings, because they are known in the art. When the apparatus is made from quartz, it is pointed out that these electrical connections 19, 21 can easily be obtained by the implantation of titanium in the wall of the case element 24.

The process for the preparation of the aforementioned structure of a miniaturized resonant pressure transducer can consist of separately preparing the rigid frame 24 supporting the converter and the resonator, as well as the case 32 with at least one of the faces thereof constituting the flexible diaphragm. Each of these two parts is separately produced by etching a silicon or quartz substrate, which leads to particularly strong one-piece systems. The two parts are then assembled with one another in order to obtain the complete transducer of FIGS. 4 to 6.

I claim:

1. A resonant pressure transducer having a deformable diaphragm or membrane exposed to an ambient environment wherein the pressure to be measured prevails, a converter for transmitting the force experienced by the diaphragm to a resonator vibrated by an exciter and whose resonant frequency, which is measured, is a function of the intensity of said force, i.e., the pressure to be determined, and wherein the assembly formed by the converter and the resonator is mounted in a rigid frame, the converter having flexible, bending means for absorbing the bending moments resulting from the deformation of the diaphragm, so as to transmit to the resonator a tension or a compression force free from bending moments, which generate stresses at the entrance of the resonator.

2. A resonant pressure transducer according to claim 1, wherein the rigid frame is rectangular and has, along its longitudinal axis, a pivot mounted so as to rotate about two hinges connecting it to the side walls of the frame and whose general direction is perpendicular to the longitudinal axis of the frame, a shoulder connected to the walls of the frame by a system of fins, whose plane of orientation is substantially perpendicular to that of the frame, a flexible, bending beam connecting the shoulder and the pivot and a beam serving as a resonator connecting the side of the shoulder opposite to the flexible, bending beam to one of the sides of the rigid frame perpendicular to its longitudinal axis and also wherein the rigid frame is fitted in the median plane of a parallelepipedic case, whereof at least one of the faces parallel to the plane of the frame is constituted by a diaphragm deformable under the effect of the pressure to which it is exposed, the deformations of said diaphragm being transmitted to the pivot by a stud integral with the diaphragm and mechanically connecting said diaphragm to the pivot.

3. A transducer according to claim 2, wherein the diaphragm and the rigid frame are produced separately, from the same material chosen from among quartz and silicon, using a one-piece substrate of said material etched by micromachining processes and then assembled.

4. A transducer according to claim 1 wherein the diaphragm and the rigid frame are produced separately, from the same material chosen from among quartz and silicon, using a one-piece substrate of said material etched by micromachining processes and then assembled.

* * * * *

UNITED STATES PATENT AND TRADEMARK OFFICE
CERTIFICATE OF CORRECTION

PATENT NO. : 5,317,917
DATED : JUNE 7, 1994
INVENTOR(S) : Michel DUFOUR

It is certified that error appears in the above-indentified patent and that said Letters Patent is hereby corrected as shown below:

Claim 3, column 8, line 3, "2" should be --1--.

Claim 4, column 8, line 9, "1" should be --2--.

Signed and Sealed this

Twenty-first Day of March, 1995

Attest:

BRUCE LEHMAN

*Attesting Officer*  *Commissioner of Patents and Trademarks*